US008555545B2

(12) United States Patent
Fischer et al.

(10) Patent No.: US 8,555,545 B2
(45) Date of Patent: Oct. 15, 2013

(54) ENHANCED VEGETATIVE ROOF SYSTEM

(75) Inventors: Kurt T. Fischer, Woodstock, IL (US);
Thomas M. Hanzely, Algonquin, IL
(US); Kathy M. Baumann, Roscoe, IL
(US); Timothy McFarland, Roscoe, IL
(US); Darran Sellers, Milton, WI (US)

(73) Assignee: American Builders & Contractors Supply Co., Inc., Beloit, WI (US)

( * ) Notice: Subject to any disclaimer, the term of this patent is extended or adjusted under 35 U.S.C. 154(b) by 0 days.

(21) Appl. No.: 13/401,906

(22) Filed: Feb. 22, 2012

(65) Prior Publication Data

US 2013/0167440 A1   Jul. 4, 2013

Related U.S. Application Data

(60) Provisional application No. 61/445,647, filed on Feb. 23, 2011.

(51) Int. Cl.
*A01G 9/02* (2006.01)

(52) U.S. Cl.
USPC ........................................................ 47/65.9

(58) Field of Classification Search
USPC ................................ 47/65.9, 66.5, 66.1, 65.5
See application file for complete search history.

(56) References Cited

U.S. PATENT DOCUMENTS

| | | | | |
|---|---|---|---|---|
| 5,595,021 A | * | 1/1997 | Ripley et al. | ................... 47/66.5 |
| 5,675,933 A | * | 10/1997 | Kawaguchi et al. | ............ 47/65.8 |
| 7,448,163 B2 | * | 11/2008 | Beeman et al. | .................... 47/65 |
| 2002/0007592 A1 | * | 1/2002 | Mischo | ........................... 47/65.9 |
| 2006/0242901 A1 | * | 11/2006 | Casimaty et al. | .............. 47/65.9 |
| 2008/0236041 A1 | * | 10/2008 | Carpenter | ....................... 47/65.9 |
| 2011/0045916 A1 | * | 2/2011 | Casimaty et al. | ............... 472/92 |
| 2011/0167724 A1 | * | 7/2011 | Mischo | ........................... 47/65.9 |
| 2011/0232183 A1 | * | 9/2011 | Chang | ............................. 47/65.9 |

FOREIGN PATENT DOCUMENTS

| | | |
|---|---|---|
| FR | 2941477 | 7/2010 |
| WO | WO 2004/020762 A2 | 3/2004 |
| WO | WO 2010/089663 A1 | 8/2010 |

* cited by examiner

*Primary Examiner* — Monica Williams
(74) *Attorney, Agent, or Firm* — Charles S. Sara, Esq.; Navid Fanaeian, Esq.; DeWitt Ross & Stevens SC

(57) ABSTRACT

A vegetative roof system includes modules for holding growth media in which plants can grow. The modules can communicate with each other, sharing moisture/nutrients, increasing airflow to enhance plant respiration, allowing soil-borne animals/insects to travel between modules, etc. A rooting channel and/or a scalloped sidewall allow the roots of plants in the module to extend to adjacent modules. Alignment notches in sidewalls facilitate alignment of rooting channels between adjacent modules. Vertical zones help facilitate placement of abutting modules flush with each other. The rooting channels may be formed at the vertical zones to enhance continuity between and among modules. Sheet inserts can control rooting between modules and restrict undesired spillage through rooting channels (temporarily if biodegradable). Module inserts help control the quantity and depth of growth media, affecting module weight and rooting levels. An elevated connector can secure two or more modules together using downwardly-radiating prongs.

28 Claims, 3 Drawing Sheets

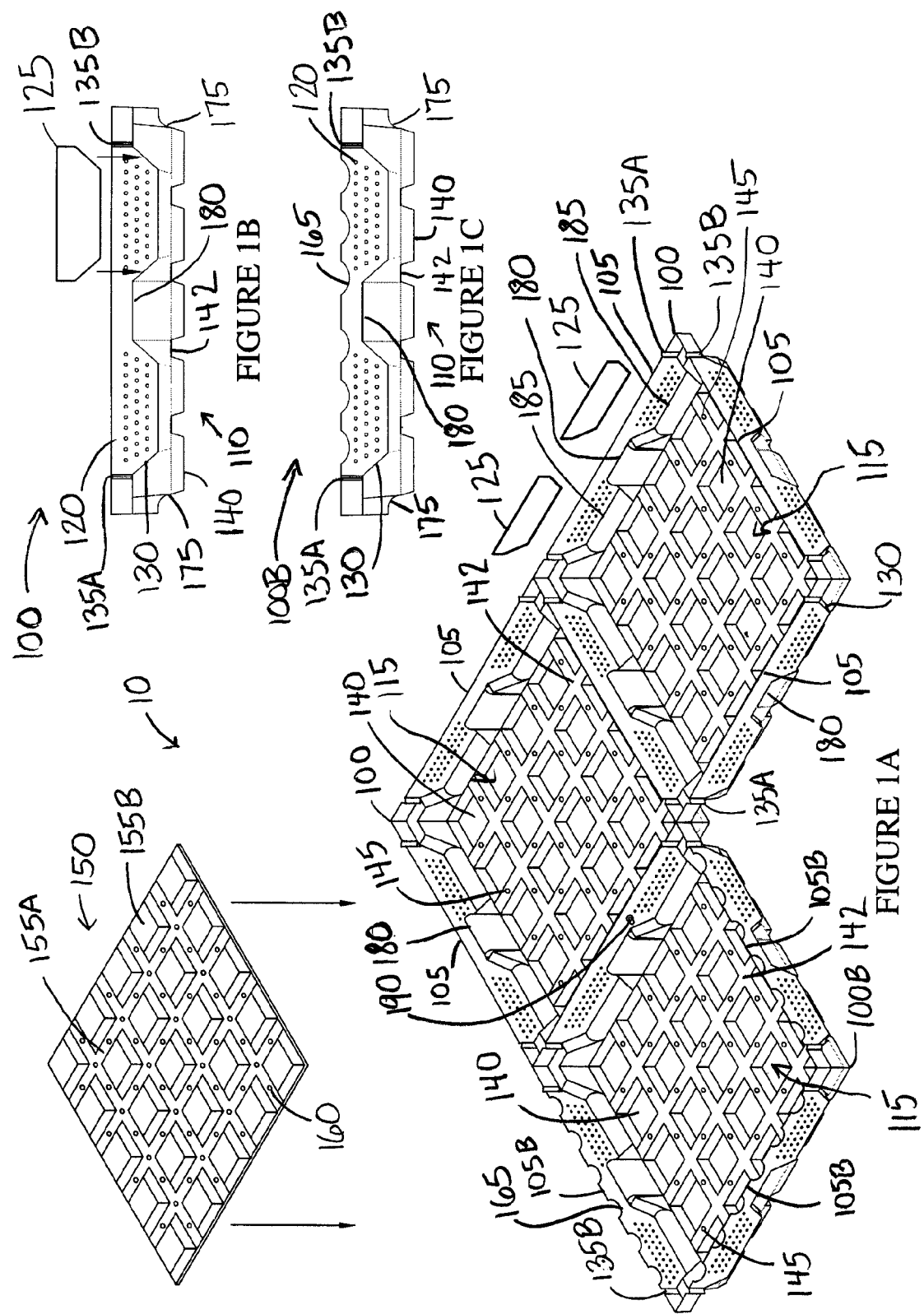

ENHANCED VEGETATIVE ROOF SYSTEM

This application claims priority under 35 USC §119(e) to U.S. Provisional Patent Application 61/445,647 filed Feb. 23, 2011, the entirety of which is incorporated by reference herein.

FIELD OF THE INVENTION

This document concerns an invention relating generally to an enhanced vegetative roof system including a module capable of communicating with adjacent modules.

BACKGROUND OF THE INVENTION

A "vegetative roof" (or "green roof") refers to the environmentally-friendly addition of growth media and vegetation (i.e., plants) to the roof of a building. Vegetative roofs have environmental and economic benefits over traditional black or white-reflective membrane roofs, enhancing stormwater management, reducing energy costs, and extending roof lives. Heat is not retained in vegetative roofs the way it is in black roofs; thus, the city may be able to cool faster. Vegetative roofs can thus reduce the urban heat island effect common to most large cities. Due to the ability of plants to transpire and also provide shade, significant use of vegetative roofs throughout large cities can cause a cooling effect, lowering the temperature in city environments. In addition, since buildings with vegetative roofs are cooler and require less air conditioning, the subsequent ventilation of hot air from an air conditioner to the atmosphere is reduced. Vegetative roof technology can extend roof life and it provides sound insulation, which can be essential for buildings located in noisy areas, such as near airports, highways, or heavy industry. They can additionally provide habitat for wildlife.

The growth media of vegetative roofs can be contained in modules that can be placed directly on a roof. These modules typically include a bottom, four sidewalls, and an open top, with the growth media inside. A desired number of modules containing growth media and plants can be placed on the roof side by side in rows and columns. Traditional modules include angled sidewalls and a folded-over top edge. Such sidewalls result in large air gaps between the modules, impacting energy efficiency and acoustic insulation. The exposed areas of adjacent modules can also form exposed black plastic seams that may heat up rapidly in sunlight, heating the airspace and causing uneven drying-out of the contents around the perimeters of the modules, with adverse effects on some types of plants. What is needed is an improved module that (1) minimizes the potential negative effects on plant health, energy efficiency, and acoustics; (2) retains structural integrity; and (3) effectively utilizes available space, minimizing the grid pattern of modules that is visible after installation.

Additionally, traditional modules are designed to hold growth media and keep their contents separate from other modules. Conventional sidewalls thus do not allow adjacent modules to "communicate" (i.e., to exchange airflow, nutrients, moisture, etc. between and among each other). They also do not allow the roots of plants to extend beyond the boundaries of the individual modules, confining and restricting growth media to the detriment of plant health. What is needed is a way of allowing modules to communicate with each other without sacrificing other aspects such as structural integrity and the ability to easily identify individual modules for removal and/or replacement.

SUMMARY OF THE INVENTION

The invention, which is defined by the claims set forth at the end of this document, is directed to a vegetative roof system for growing plants on a roof that at least partially alleviates the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1A, 1B, and 3, an exemplary vegetative roof system 10 includes a module 100 having first, second, third, and fourth sidewalls 105. The four sidewalls 105 extend upwardly from a module base 110 to define an interior volume 115 for holding growth media 305 in which plants can grow. Two or more adjacent modules 100 are able to communicate with each other by, for example, having roots 310 extending therebetween, sharing moisture and nutrients, increasing airflow to enhance plant respiration, and allowing soil-borne animals/insects to travel between modules 100 (thereby increasing ease of colonization and promoting biodiversity). At least a first sidewall 105 may include one or more rooting channels 120 through which plant roots 310 can extend to adjacent modules 100, as shown in FIG. 3. The modules 100 of the system can be configured to hold growth media 305 with little or no undesired spillage through the rooting channels 120 by, for example, adjusting the size, placement, number, etc., of rooting channels 120 and/or by using sheet inserts 125 to cover the rooting channels 120. At least one sidewall 105 preferably includes a vertical zone 130 that is substantially perpendicular to the module base 110. Vertical zones 130 facilitate the placement of two modules 100 next to each other with no substantial gap between adjacent sidewalls 105 at their vertical zones 130. The rooting channels 120 are preferably formed in the vertical zones 130 of the sidewalls 105 and configured to align with the rooting channels 120 of adjacent modules 100 to provide continuity between and among the interior volumes 115 of the modules 100 of the vegetative roof system 10. Alignment notches 135A, 135B formed in the sidewalls 105 of the module 100 can facilitate the proper alignment of adjacent modules 100 so that rooting channels 120 at least partly overlap.

The base 110 of the module 100 includes one or more liquid retention reservoirs 140 configured to retain fluids in the module 100. A base drainage aperture 145 formed in the module base 110 is configured to permit the module 100 to drain liquid that is not retained by the liquid retention reservoirs 140. A module insert 150 can be placed in the module 100 so as to preclude growth media 305 contained in the interior volume 115 of the module 100 from entering the liquid retention reservoirs 140. The contours of the module insert 150 can be varied (by, e.g., providing valleys 155A and hills 155B) so as to control the quantity of growth media 305 that can fit in the module 100 (and thus the weight of a full module 100). Varying contours can also allow for variable growth media 305 depths and thus variable depths to which plant roots 310 can grow in the module 100. The module insert 150 can include a module insert drainage aperture 160, and the module insert drainage aperture 160 preferably overlaps the base drainage aperture 145 when the module insert 150 is inserted in the module 100 to facilitate drainage of excess fluids out of the module 100 from below. The rooting channels 120 of the module 100 are preferably formed in the sidewalls 105 of the module 100 at a height no lower than the top of the liquid retention reservoir 140 so that retained liquid does not leak through the rooting channels 120.

Referring to FIGS. 2A-2C, two or more modules 100 can be secured to each other using an elevated module locking mechanism such as a pronged connector 200 that includes a cap 205 having downwardly extending prongs 210A, 210B, 210C radially spaced from each other. To secure two modules 100 together, a first prong 210A and a second prong 210C can be positioned to extend downwardly into the interior volumes 115 of the two modules 100, as shown in FIG. 2B. To enhance stability, the cap 205 can be secured to a shaft 215 that extends downwardly towards a connector base 220, with the connector base 220 positioned between the modules 100.

Further advantages and features of the invention will be apparent from the remainder of this document in conjunction with the associated drawings.

BRIEF DESCRIPTION OF THE DRAWINGS

FIG. 1A is a perspective view of an exemplary roof vegetation system showing three modules 100 abutting each other, with one of the modules 100B having sidewalls 105B with scalloped top edges 165. FIG. 1B is a side view of a module sidewall 105 having several rooting channels 120 formed therein. FIG. 1C is a side view of an alternative sidewall 105B having a scalloped top edge 165.

DETAILED DESCRIPTION OF PREFERRED VERSIONS OF THE INVENTION

Figure 3:
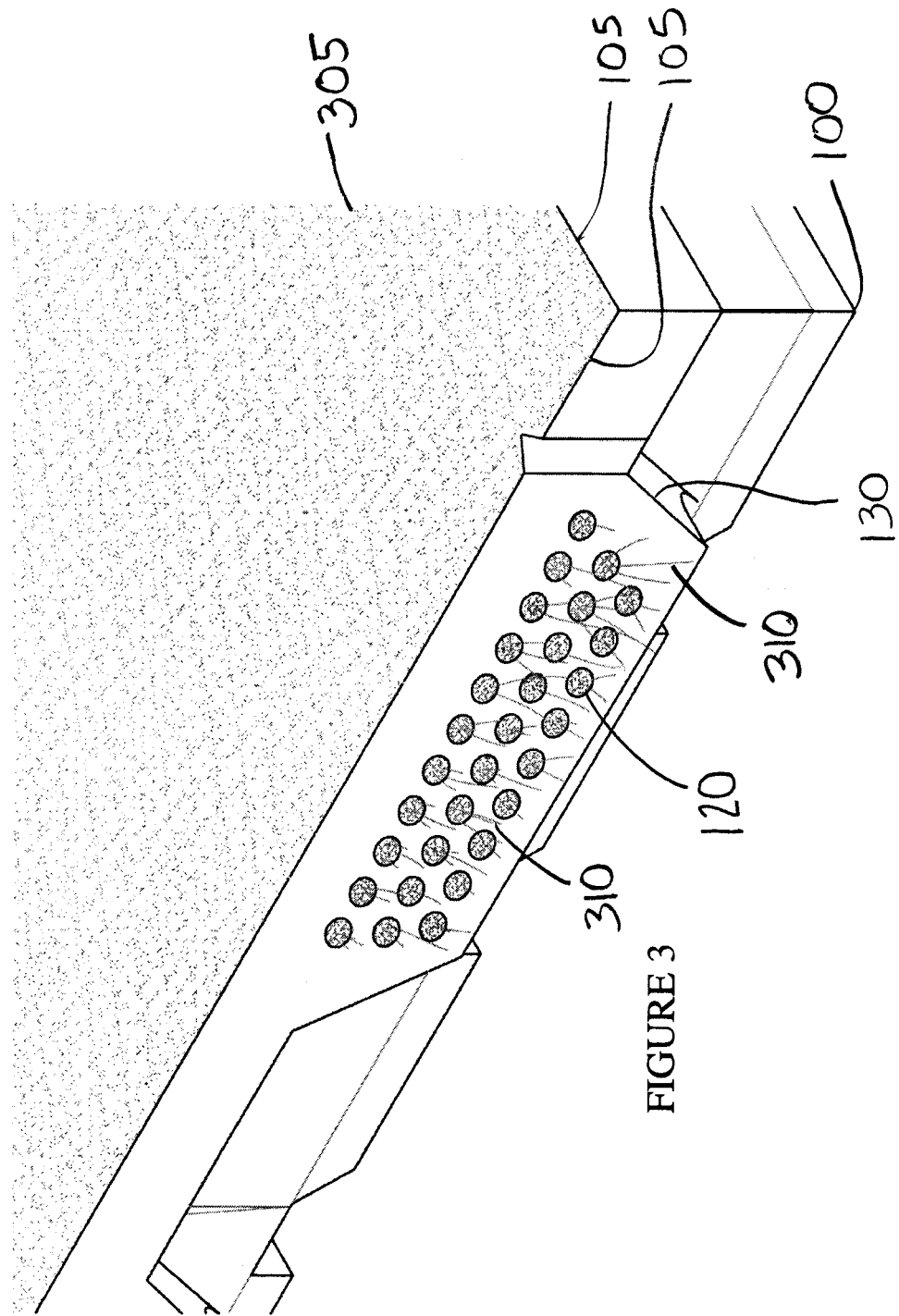
FIG. 3 is a close-up perspective view of one of the modules 100 of FIGS. 1A, 1B, 2A, and 2B holding growth media 305, with roots 310 of plants in the growth media 305 extending through rooting channels 120 in a sidewall 105 of module 100.

Returning to FIGS. 1A and 3 the exemplary vegetative roof system 10 is made up of one or more individual, easily-moveable modules 100 or panels. Four sidewalls 105 rise upwardly to various heights to define the interior volume 115 that can contain components of the vegetative roof system 10 (such as engineered growth media 305, filter fabrics, plants, etc.). Individual modules 100 can be placed side-by-side on a roof to fully cover a designated area, resulting in a visually uniform stand of vegetation. Modules 100 are removable as needed to, for example, perform underlying roof repairs. The vegetative system provides for enhanced modularity and improves on hybrid or monolithic systems. Features such as full height sidewalls 105 with a perimeter edge flush with the level of growth media 305 (see FIG. 3) facilitates the separation and removal of a module 100 from adjoining modules 100. This enhances access in the vegetative roof system 10, enabling removal without significant disturbance to plants and growth media 305. Interconnecting roots 310 extending through the rooting channels 120 can easily be cut or torn away when pulled apart, allowing the entire module 100 assembly to be lifted out to access the underlying roof and replaced as necessary. The vegetative roof system 10 allows the modules 100 to remain independent of each other, making them easier to add and/or remove as desired.

The vertical zones 130 of the modules 100 provide for zero or near-zero draft sidewalls 105, minimizing the air space between adjacent modules 100. Zero or near-zero draft sidewalls 105 in rooting channel zones (i.e., where the rooting channels 120 are positioned) help minimize airspace between rooting channels 120 and enhance continuity, promoting optimal root growth and inter-module sharing of air, water, nutrients, insects, etc. The zero or near-zero draft sidewalls 105 is achieved at least in part by having a vertical edge at 90 degrees with respect to the horizontal (such as at the vertical zones 130). A small draft angle may be provided if appropriate so as to facilitate the stacking of empty modules 100 inside each other to maximize freight/shipping efficiencies. Such a draft angle would be minimized such that the rooting channel 120 zones are in direct contact with a small or negligible air gap between them.

Both the size and the placement of rooting channels 120 are calibrated such that when two or more modules 100 are placed adjacent to each other and properly aligned, the individual apertures and their overall pattern line up with each other. Alignment of modules 100 can be aided during installation by alignment notches 135A, 135B (small protrusions and indentations that are complementary to each other) formed in the sidewalls 105. Each sidewall 105 can include two alignment notches, a "male" notch 135A (a protrusion extending outwardly from the module sidewall 105) and a "female" notch 135B (extending inwardly into the interior volume 115 of the module 100). This helps ensure that the rooting channels 120 of adjacent modules 100 provide continuity among the interior volumes 115 of modules 100. When modules 100 are properly aligned, such that the rooting channels 120 at least partly overlap, the rooting channels 120 provide interconnectivity in the form of void space between modules 100, while allowing the modules 100 to retain a full perimeter edge up to the full height of the module 100.

Rooting channels 120 are a calibrated set of apertures or slots extending through module sidewalls 105 at predetermined locations that allow the interior volumes 115 of modules 100 to communicate and permit plant roots 310 to grow between modules 100. A rooting channel zone may include one or a series of drilled rooting channels 120—apertures sized optimally to minimize undesired leakage of growth media 305 (based on the average grain size distribution of the growth media 305). Typical rooting channels 120 may be circular, oval, rectangular, mitered slots, etc., ranging in diameter from 0.25 inches (about 0.5 centimeters) to one inch (about 2.5 centimeters), with 0.5-inch (about 1.25 centimeter) diameter rooting channels 120 being appropriate for a variety of growth media 305 and vegetation types. Larger or smaller apertures may be suitable or desirable for specific plant types and in specific areas or climate regions. For example, the rooting channels 120 can be configured to accommodate plants having non-aggressive rooting characteristics (such as those of selected groundcover species) as well as plants having aggressive rooting characteristics (such as those of native/conventional perennial species). Varying the number, dimensions, and placement of the rooting channels 120 can aid in achieving a maximum balance of nutrients and moisture between modules 100. The rooting channels 120 can help maximize open area (allowing for the most apertures or slots possible with no more than negligible spillage) along each side of the module 100 in a vertical zone 130 (where much of the lateral root spreading takes place) while ensuring adequate structural integrity of the sidewalls 105. This provides maximum root spreading ability (less resistance), and optimizes open area for airflow (plant respiration) and sharing of moisture, nutrients, insects, etc., among modules 100.

In the module 100 of FIG. 1A, the module base 110 serving as the floor/bottom of the module 100 may include 25 square liquid retention reservoirs/cups 140, each reservoir 140 having (for example) 3.5-inch (about 9 centimeter) sides and a nominal depth of 0.75 inches (about 2 centimeters). The liquid retention reservoirs 140 provide volumetrically-increased water retention characteristics, allowing for use of the modules 100 as a storm water BMP ("best management practice"). Base water drainage apertures having (for example) 0.25-inch (about 0.5 centimeter) diameters may be positioned between the liquid retention reservoirs 140 in the base. The sidewalls 105 of the modules 100 shown in FIGS. 1B and 1C include two sets of approximately 0.375-inch (about 1 centimeter) diameter rooting channels 120, each set having 30 rooting channels 120 in three rows, for a total of 60 rooting channels 120. Each sidewall 105 may have (for example) a width of about two feet (about 0.6 meters) and a height of about 4.25 inches (about 11 centimeters).

The optional module insert 150 can be fit onto the module base 110 and can be used to vary the contour of the bottom of the module 100. The module insert 150 may include individual sheets of plastic cut or molded to fit inside the module 100 and lay flat on the upper ridges 142 formed by the liquid retention reservoirs 140. A simple flat module insert 150 with apertures or slots 160 will preclude growth media 305 from filling the liquid retention reservoirs 140, maximizing water capacity in the liquid retention reservoirs 140 (and enhancing storm water management). This could increase the water retention of the module 100 by the equivalent volume of growth media 305 not present in the liquid retention reservoirs 140.

Modified inserts 150 may also be utilized that contain ridges or elevated areas 155B in various patterns so as to reduce the overall volume of growth media 305 needed to fill the module 100. That is, a module insert 150 can have "low points" 155A and "high points" 155B, with the high points 155B providing zones or covered areas with additional air/void space. The module insert 150 shown in FIG. 1A includes elevated areas 155B positioned to correspond with the positions of the liquid retention reservoirs 140 in the module base 110. Because growth media 305 added to the module 100 on top of the module insert 150 would not enter the void space beneath the high points 155B, the module 100 would be able to hold less growth media 305. That is, the void space can occupy volume that could have otherwise been taken by growth media 305. By decreasing the maximum quantity of growth media 305 that could fit in the module 100, the high points 155B decrease the maximum weight of modules 100. This may be particularly desirable in vegetation systems 10 in which overall system weight may be a concern, such as those with larger or deeper modules 100 having, for example, heights of six or more inches (about 15 or more centimeters). The low points 155A allow for sections of growth media 305 with greater depth, promoting optimal plant health by facilitating plant root development at greater depths. That is, the valleys 155A allow for greater growth media depth suitable for plant species that benefit from greater rooting depth.

The sidewalls 105 may be broken up into a sidewall upper half and a sidewall lower half. The vertical zones 130 and rooting channels 120 are preferably at least partly formed in the sidewall upper half. The sidewall lower half may be recessed such that the upper half extends outwardly farther than the sidewall lower half, providing an irrigation passage 175 for a lateral irrigation supply line to pass between adjacent modules 100. The molded irrigation passage 175 may be an arced-out cavity extending about the perimeter of the module 100. The irrigation passage 175 accommodates placement of, for example, a water hose or supply piping within the void space between modules 100 while maintaining flush module-to-module contact in areas with rooting channels 120 and in the upper perimeter edge. This allows for easier placement of irrigation supply lines along the bottom perimeter between the modules 100 while keeping the supply lines substantially out of view. The modularity of the vegetative roof system 10 allows the irrigation systems and piping to be routed between the modules 100 without significant modification of the individual modules 100. Fluids can be delivered to the plants via, for example, pop-up spray head fixtures attached to the lateral supply pipe at designated areas. To provide space for spray heads, a small portion of the modules 100 can be cut away at, for example, their corners or at other upper perimeter locations for proper placement. Alternatively, for example, a small-diameter, low flow drip irrigation line may be attached between the modules 100 and run up through very small gaps at the corners of modules 100 and connected to emitters situated on top of the growth media 305. A recessed handhold 180 molded midway in the sidewall 105 facilitates ergonomic and balanced lifting and carrying of the modules 100.

Referring to FIGS. 1A and 1B, growth media 305 may be contained (temporarily or permanently) within a module 100, and particularly at the rooting channel zones, by use of the sheet barrier/insert 125. Such a solid sheet insert 125 may be used to contain growth media 305 during nursery establishment, shipping, and installation, not allowing growth media 305 to extend through the rooting channels 120. The solid sheet inserts 125 may be sleeves (e.g., snap-on type sleeves) that fit into a groove or recess 185 molded into the rooting channel zone inside the module 100. The sheet insert 125 could be held in place by, for example, using a fastener that extends through a rooting channel 120. The sheet barrier 125 can be biodegradable and be designed to decompose over time, allowing for interconnectivity among units subsequent to installation. Biodegradable and/or non-biodegradable (such as ones made of plastics or cardboard) can be strategically used to control the extension of roots 310 and the exchange of nutrients, moisture, etc. between or among certain modules 100 while allowing such communication to proceed between or among other modules 100 (depending on, for example, the particular plants, growth media 305, or other components of particular modules 100). Non-biodegradable inserts used to restrict undesired interconnectivity may be particularly suited around an exposed perimeter edge of a set of modules 100. This would help retain moisture, precluding preferential drying out of the system around the perimeters, enhancing plant viability in these areas. The sheet barrier 125 may be particularly useful when lengthy pre-grow times are needed prior to installation, or if a larger diameter rooting channel 120 aperture is needed for certain plant species and there is a need to facilitate the containment (during various periods) of growth media 305 within the module 100.

Figure 2A:
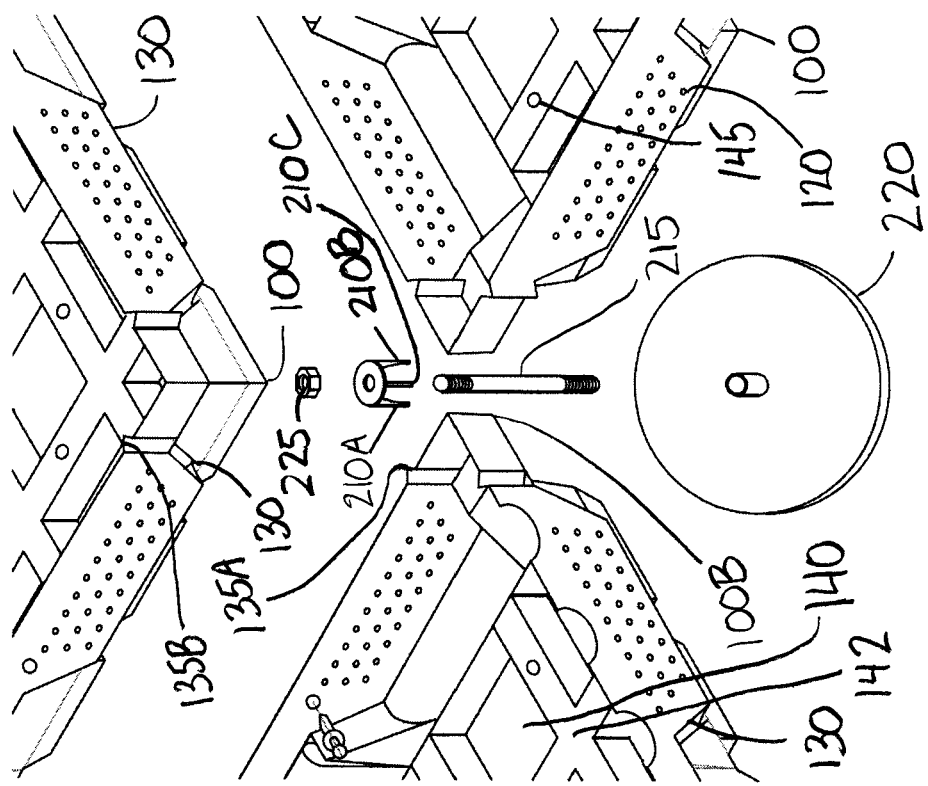
FIG. 2A is a perspective view of portions of the three modules 100 of FIG. 1A, with an exploded view of a pronged connector 200.
Figure 2B:
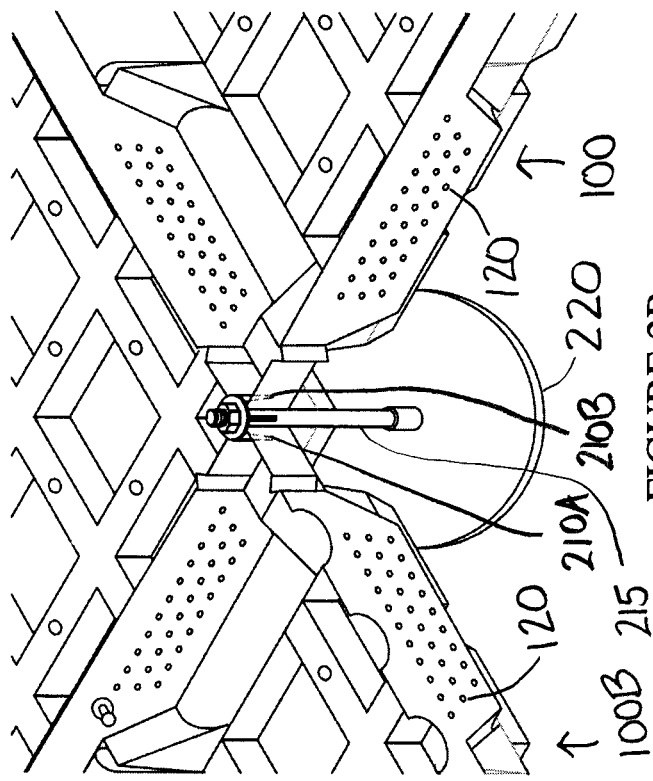
FIG. 2B shows the modules 100 of FIG. 2A secured to each other by the pronged connector 200 of FIG. 2A.
Figure 2C:
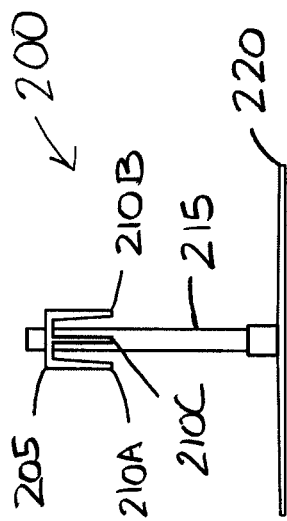
FIG. 2C is a side view of the assembled pronged connector 200 of FIG. 2B.

As shown in FIGS. 2A-2C, the vegetative roof system 10 may include the pronged connector 200 capable of securing modules 100 at, for example, their corners. The pronged connector 200 may include the flat base plate 220, the shaft 215 that is threaded at its ends, the multi-prong anchor/cap 205, and a locking wing nut 225. To assemble the pronged connector 200, the shaft 215 may be screwed into the connector base 220, the cap 205 placed over the shaft 215 with prongs 210A, 210B, 210C extending downwardly, and the wing nut 225 screwed onto the shaft 215. The threads on the shaft 215 are such that when the shaft 215 is turned, the connector base 220 is pulled up while the connector cap 205 is pulled down, pulling the modules 100 together to achieve a tighter fit. The cap 205 can be rotated (to adjust the relative position of the prongs 210A, 210B, 210C) or removed by loosening the wing nut 225. With at least one prong inserted in each module 100, four (or more) modules 100 can be secured together using the pronged connector 200, depending on the number of available prongs. Adjacent modules 100 can also be secured to each other using a clip/screw system 190 extending through the sidewalls 105 of the modules 100. Modules 100 may alternatively be fastened together using, for example, heavy-duty "zip-ties." The zip-ties may be constructed of, for example, black, UV-stabilized nylon measuring 0.3125 inches (about 0.8 centimeters) wide by 7.5 inches (about 19 centimeters) long, and having a break-strength of 120 pounds (about 55 kilograms). To fasten the zip-tie and secure modules 100 together, modules 100 may be fastened at two or more positions on the modules 100. Modules 100 can be pre-drilled using a 0.375-inch (about 1 centimeter) drill bit, and a zip-tie threaded through both modules 100 and pulled tight. Excess tie may be removed using a snipping tool. Securing modules 100 together could aid in long-term alignment of the system and reduce risk of module 100 movement in high wind situations.

As shown in FIG. 1C, an upper perimeter edge (on one or more sidewalls 105B of one or more modules 100B) may be provided with a molded or cut scalloped edge 165 (instead of or in addition to having rooting channels 120). These areas would provide additional zones of interconnectivity and promote "shallow rooting" (i.e., extension of roots 310 between modules 100 across the scalloped edges 165 rather than through rooting channels 120) between adjacent modules 100. That is, the scalloped edges 165 provide conduits for shallow root spreading near the surface of the system (e.g., in the upper inch (upper 2.5 centimeters) or so of the module 100B). This may be preferred if a pre-planted vegetation mat (similar to rolled sod), which may have a thickness of about one inch (about 2.5 centimeters)) is placed directly on the growth media 305. By lowering the level of the growth media 305 to just below the scallops 165, spillage could be avoided and the mats of adjacent modules 100B can grow together in the shallow zone while rooting channels 120 allow for inter-module communication at deeper levels. Additionally, varying the upper perimeter edge of the module 100B using scallops 165 may further help visually conceal the seam between individual modules 100.

The components of the exemplary vegetative roof system (i.e., the module 100, 100B, the elevated module locking mechanism 200, etc.) may be constructed using any materials deemed appropriate, including thermoplastics such as recycled or virgin high density polyethylene (HDPE) or high molecular weight polyethylene (HMWPE). Preferably, the materials will provide the vegetative system with at least a ten-year life expectancy and include ultraviolet (UV) additives to make the system more resistant to UV rays from the sun. Potential materials that could be used include the METZO PLAST HDPE/MF-UV available from Metzeler Plastics GmbH based in Jülich-Kirchberg, Germany.

Preferred versions of the invention have been reviewed in the foregoing discussion to illustrate different possible features of the invention and the varying ways in which these features may be combined. One or more of the above-discussed features may be independently incorporated into units without necessarily incorporating other features. Apart from combining the different features of the foregoing versions in varying ways, other modifications are also considered to be within the scope of the invention. Following is an exemplary list of such modifications.

First, the configuration of modules (e.g., combination of features, dimensions of the base/sidewalls/vertical zones, number of liquid retention reservoirs, shape of alignment notches, etc.) can be changed as desired for various applications. For example, particular roofs, growth media, plant types, climates, cost considerations, etc., may warrant modules with different combinations of features and different configurations.

Second, the configuration (e.g., number, dimensions, placement, etc.) of rooting channels may be varied greatly on a custom basis based on project-specific requirements. For example, several channels having variable sizes and heights may be arranged in one or more sidewalls, or one rooting channel may be used if appropriate for a particular application. Fewer and/or smaller rooting channels may be desired for plants having more aggressive rooting characteristics, while more and larger rooting channels patterns may be deemed appropriate for plants having relatively less aggressive rooting characteristics.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A vegetative roof system including a module, the module having:
   a. an interior volume for holding growth media in which plants can grow;
   b. a first sidewall extending upwardly from a module base, the first sidewall bounding a first side of the interior volume of the module;
   c. a rooting channel formed in the first sidewall, wherein the module is configured such that the roots of plants growing in the interior volume can extend out of the interior volume through the rooting channel of the first sidewall; and
   d. a pronged connector having a cap with downwardly extending prongs radially spaced from each other and a shaft extending upwardly from a connector base, the cap is secured to the shaft above the connector base such that the prongs extend downwardly towards the connector base;
   e. wherein the pronged connector is configured to secure the first module to a second module.

2. The system of claim 1 wherein the module is configured such that when the module is positioned adjacent to a substantially-identical second module, the interior volumes of the adjacent modules can communicate with each other through their sidewalls.

3. The system of claim 1 wherein:
   a. the first sidewall includes a first sidewall upper half and a first sidewall lower half; and
   b. the rooting channel is formed in the first sidewall upper half.

4. The system of claim 1 wherein the module is configured to contain growth media therein with substantially no spillage of growth media out of the module through the first sidewall.

5. The system of claim 1 wherein the first sidewall includes a vertical zone that is at least substantially perpendicular to the module base.

6. The system of claim 5 the rooting channel is formed in the vertical zone of the first sidewall.

7. The system of claim 1 wherein the first sidewall includes a vertical zone formed therein, the vertical zone being at least substantially perpendicular to the module base such that, when the first sidewall of the module is adjacent to the first sidewall of a substantially identical second module, the vertical zones of the two modules are flush with each other.

8. The system of claim 1 wherein the first sidewall includes an alignment notch configured to facilitate placement next to a substantially identical second module such that the rooting channels of the two modules overlap.

9. The system of claim 1 further including a sheet barrier configured cover the rooting channel such that extension of plant roots through the rooting channel is restricted.

10. The system of claim 9 wherein the sheet barrier is biodegradable such that the extension of plant roots through the rooting channel is restricted until the sheet barrier has degraded.

11. The system of claim 1 wherein the first sidewall further includes a first sidewall top edge that is scalloped to allow shallow rooting between the module and an adjacent substantially-identical second module.

12. The system of claim 1 wherein:
 a. the first sidewall includes a first sidewall upper half and a first sidewall lower half; and
 b. a portion of the first sidewall upper half extends outwardly farther than a portion of the first sidewall lower half such that the first sidewall lower half provides an irrigation passage for an irrigation line, whereby when the module abuts a substantially identical second module, an irrigation line may pass between the two modules through the irrigation passage.

13. The system of claim 1 wherein:
 a. the module is a first module, the first sidewall is a first module first sidewall, and the rooting channel is a first module rooting channel;
 b. the system further includes a second module having a second module first sidewall with a second module rooting channel formed therein; and
 c. the first module is positioned adjacent to the second module such that:
  i. the first module first sidewall abuts the second module first sidewall; and
  ii. the first module rooting channel at least partly overlaps the second module rooting channel.

14. The system of claim 1 wherein:
 a. the pronged connector includes a first prong and a second prong; and
 b. the first module is securable to the second module by having the first prong and the second prong of the pronged connector extend downwardly into the interior volumes of the first module and the second module, respectively.

15. The system of claim 1 wherein the module base includes a liquid retention reservoir configured to retain liquid in the module.

16. The system of claim 15 wherein the rooting channel is positioned at a height above the top of the liquid retention reservoir.

17. The system of claim 15 wherein:
 a. the liquid reservoir is a first liquid reservoir;
 b. the system further includes a second liquid reservoir; and
 c. the module base further includes a module base drainage aperture situated between the first liquid reservoir and the second liquid reservoir, the module base drainage aperture being configured to permit the module to drain liquids not retained in the liquid retention reservoirs.

18. The system of claim 15 further including a module insert placed within the module, wherein the module insert is configured to preclude growth media contained in the interior volume from entering the liquid retention reservoir.

19. The system of claim 18 wherein the module insert has a varying contour configured to:
 a. provide void space between the module base and the module insert at high points in order to decrease a maximum quantity of growth media able to fit in the module above the module insert when the module insert rests on the module base; and
 b. provide relatively deeper rooting potential in the module at low points.

20. The system of claim 15 further including a module insert placed within the module, wherein:
 a. the module insert includes a module insert drainage aperture;
 b. the module base further includes a module base drainage aperture; and
 c. the module insert is positioned within the module such that the module insert drainage aperture overlaps the module base drainage aperture to permit liquids to drain out of the module.

21. The system of claim 1 wherein the module includes several rooting channels, each rooting channel ranging in diameter from at least substantially 0.375 inch to at least substantially 0.75 inch.

22. A vegetative roof system,
 a. the roof system including a module having:
  i. an interior volume; and
  ii. a first sidewall extending upwardly from a module base, the first sidewall including a vertical zone that is at least substantially perpendicular to the module base;
 b. wherein the first sidewall is configured such that when the module is positioned adjacent to a substantially identical second module:
  i. the vertical zones can abut each other with substantially no gap therebetween; and
  ii. the interior volumes of the adjacent modules can communicate with each other through the vertical zones of the first sidewalls;
 c. a pronged connector having a cap with downwardly extending prongs radially spaced from each other and a shaft extending upwardly from a connector base, the cap is secured to the shaft above the connector base such that the prongs extend downwardly towards the connector base;
 d. wherein the pronged connector is configured to secure the module to a second substantially identical module.

23. The system of claim 22 wherein the module includes a rooting channel formed in the vertical zone of the first sidewall, the rooting channel being configured to permit roots of plants growing in the module to extend therethrough.

24. A vegetative roof system,
 a. the roof system including a module having:
  i. a module base having a liquid retention reservoir formed therein;
  ii. an interior volume bounded by a first sidewall, a second sidewall, a third sidewall, and a fourth sidewall, each of the first, second, third, and fourth sidewalls extending upwardly from the module base; and
  iii. one or more rooting channels formed in one or more of the first, second, third, and fourth sidewalls, the rooting channels being configured such that roots of vegetation growing in the module can extend from the interior volume and through the one or more rooting channels;
 b. wherein the rooting channels are positioned at a rooting height equal to or higher than a height of the top of the liquid retention reservoir formed in the module base;
 c. a pronged connector having a cap with downwardly extending prongs radially spaced from each other and a shaft extending upwardly from a connector base, the cap is secured to the shaft above the connector base such that the prongs extend downwardly towards the connector base;

d. wherein the pronged connector is configured to secure the module to a second substantially identical module.

25. The system of claim 24 wherein the one or more rooting channels are configured such that growth media placed in the interior volume is contained in the module with substantially no loss of growth media through the rooting channels.

26. The system of claim 24 wherein the module is configured such that, when the module abuts a substantially identical second module, growth media in the two modules can exchange moisture and nutrients through the rooting channels.

27. A vegetative roof system,
a. the system including:
   i. a first module and a second module,
      1) each of the first and second modules including a sidewall extending upwardly from a base,
      2) the sidewall bounding an interior volume for holding growth media; and
   ii. a pronged connector having:
      1) a shaft extending upwardly from a connector base; and
      2) a cap secured to the shaft at a position above the connector base,
         a) the cap having a first prong and a second prong,
         b) the first and second prongs extending downwardly towards the connector base;
b. wherein the pronged connector is configured to secure the first module to the second module by having the first prong and the second prong extend downwardly into the interior volumes of the first module and the second module, respectively, such that the prongs of the cap prohibit the modules from being pulled apart from each other.

28. The system of claim 27 wherein the sidewall of each of the first and second modules includes:
a. a rooting channel configured to allow growth media in the first and second modules to exchange moisture and nutrients; and
b. an alignment notch configured to facilitate alignment of the rooting channels when the first and second modules are placed adjacent to each other.

* * * * *